United States Patent
Rungta et al.

(10) Patent No.: US 9,169,393 B2
(45) Date of Patent: *Oct. 27, 2015

(54) ANTICORROSION COATINGS

(71) Applicant: 3M INNOVATIVE PROPERTIES COMPANY, St. Paul, MN (US)

(72) Inventors: Atri A. Rungta, St. Paul, MN (US); Ilya Gorodisher, Stillwater, MN (US); Mario A. Perez, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,290

(22) Filed: Apr. 16, 2014

(65) Prior Publication Data

US 2015/0031819 A1 Jan. 29, 2015

Related U.S. Application Data

(60) Provisional application No. 61/858,238, filed on Jul. 25, 2013.

(51) Int. Cl.
| | |
|---|---|
| C08L 79/04 | (2006.01) |
| C09D 179/04 | (2006.01) |
| C09J 179/04 | (2006.01) |
| C08G 73/06 | (2006.01) |
| C08L 27/12 | (2006.01) |
| C09D 5/08 | (2006.01) |
| C08G 14/06 | (2006.01) |
| C09D 7/12 | (2006.01) |
| C08K 5/31 | (2006.01) |
| C08K 5/315 | (2006.01) |
| C08G 73/02 | (2006.01) |
| C08K 5/16 | (2006.01) |
| C08K 5/357 | (2006.01) |

(52) U.S. Cl.
CPC ............... C08L 79/04 (2013.01); C08G 14/06 (2013.01); C08G 73/06 (2013.01); C08L 27/12 (2013.01); C09D 5/08 (2013.01); C09D 5/086 (2013.01); C09D 7/1233 (2013.01); C09D 179/04 (2013.01); C09J 179/04 (2013.01); C08G 73/0233 (2013.01); C08K 5/16 (2013.01); C08K 5/31 (2013.01); C08K 5/3155 (2013.01); C08K 5/357 (2013.01)

(58) Field of Classification Search
CPC ....... C08L 79/04; C09J 179/04; C09D 179/04
USPC .......................................... 524/500; 525/417
See application file for complete search history.

(56) References Cited

U.S. PATENT DOCUMENTS

| | | | |
|---|---|---|---|
| 3,018,262 A | 1/1962 | Schroder | |
| 3,298,998 A | 1/1967 | McConnell | |
| 3,496,250 A | 2/1970 | Czerwinski | |
| 4,501,864 A * | 2/1985 | Higginbottom | ............... 525/484 |
| 4,902,667 A | 2/1990 | Whitcomb | |
| 5,543,516 A | 8/1996 | Ishida | |
| 5,859,153 A | 1/1999 | Kirk | |
| 6,207,786 B1 | 3/2001 | Ishida | |
| 6,376,080 B1 | 4/2002 | Gallo | |
| 6,890,995 B2 | 5/2005 | Kolb | |
| 7,041,772 B2 | 5/2006 | Aizawa | |
| 7,053,138 B2 | 5/2006 | Magendie | |
| 7,517,925 B2 | 4/2009 | Dershem | |
| 7,575,789 B2 | 8/2009 | McKeen | |
| 7,588,058 B2 | 9/2009 | McKeen | |
| 7,847,034 B2 | 12/2010 | Burns | |
| 7,870,877 B2 | 1/2011 | McKeen | |
| 7,871,684 B2 | 1/2011 | McKeen | |
| 8,003,750 B2 * | 8/2011 | Setiabudi | ....................... 528/210 |
| 8,383,706 B2 | 2/2013 | Gorodisher | |
| 8,410,202 B1 * | 4/2013 | Wu et al. | ........................ 524/104 |
| 2010/0015343 A1 | 1/2010 | Setiabudi | |
| 2010/0210745 A1 | 8/2010 | McDaniel | |
| 2010/0312004 A1 | 12/2010 | Gorodisher | |
| 2013/0209812 A1 | 8/2013 | Gorodisher | |

FOREIGN PATENT DOCUMENTS

| | | |
|---|---|---|
| WO | WO 98-08906 | 3/1998 |
| WO | WO 2012-134731 | 10/2012 |

OTHER PUBLICATIONS

International Search Report for PCT International Application No. PCT/US2014/047506 on Nov. 3, 2014, 3 pages.
Bonnaud, "Use of reactive polyetherimide to modify epoxy thermosets. I- Synthesis of an amino-grafted polyetherimide", European Polymer Science Journal, 2004, vol. 40, pp. 2637-2643.
Fainleib, "Structure Development in Aromatic Polyisocyanurate Networks Modified with Hydroxyl-Terminated Polyethers", Polymer, 2001, vol. 42, pp. 8361-8372.
Ghosh, "Polybenzoxazine-new high performance thermosetting resins: synthesis and properties", Prog. Polym. Sci., 2007, vol. 32, pp. 1344-1391.
Rimdusit, "Development of New Class of Electronic Packaging Materials Based on Ternary Systems of Benzoxazine, Epoxy, and Phenolic Resins", Polymer, 2000, vol. 41, No. 22, pp. 7941-7949.

(Continued)

Primary Examiner — Michael M Bernshteyn
(74) Attorney, Agent, or Firm — Kent S. Kokko

(57) ABSTRACT

Curable compositions comprising a benzoxazine component, a polyamine component and a fluoropolymer component are described. The compositions may be cured to produce compositions useful in coating, sealants, adhesive and many other applications.

26 Claims, No Drawings

(56) References Cited

OTHER PUBLICATIONS

Kimura, "New Thermosetting Resin from Bisphenol A-based Benzoxazine and Bisoxazoline", J. App. Polym. Sci., 1999, vol. 72, pp. 1551-1558.

Liu, "Novel Thermosetting Resins Based on 4-(N-maleidophenyl)glycidylether: II. Bismaleimides and polybismaleimides", Polymer, 2004, vol. 45, pp. 1797-1804.

Robinette, "Toughening of Vinyl Ester Resin Using Butadiene-Acrylonitrile rubber modifiers", Polymer, 2004, vol. 45, p. 6143-6154.

* cited by examiner

ANTICORROSION COATINGS

CROSS REFERENCE TO RELATED APPLICATIONS

This application claims priority from U.S. Provisional Application Ser. No. 61/858,238, filed Jul. 25, 2013, the disclosure of which is incorporated by reference in its/their entirety herein.

FIELD OF THE INVENTION

The present disclosure is directed to novel oligomers and polymers derived from the reaction of benzoxazine compounds with a mixture of amine compounds and a fluoropolymer. The compositions are useful in coating, sealant, adhesive and many other applications.

BACKGROUND

Benzoxazines and compositions containing benzoxazines are known (see for example, U.S. Pat. No. 5,543,516 and U.S. Pat. No. 6,207,786 to Ishida, et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura, et al., "New Thermosetting Resin from Bisphenol A-based Benzoxazine and Bisoxazoline", J. App. Polym. Sci., 72, 1551-58 (1999).

U.S. Pat. No. 4,501,864 (Higginbottom) reports a curable composition comprising a poly(3,4-dihydro-3-substituted-1,3 benzoxazine) and a reactive polyamine, wherein the polyamine is at least difunctional and its reactive groups are primary or secondary amine, and wherein the poly(dihydrobenzoxazine) is the reaction product of about one equivalent of a primary amine, about one equivalent of a phenol and about two equivalents of formaldehyde.

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

U.S. Pat. No. 6,207,586 (Ishida et al.) states that the polymerization of benzoxazine monomers to a polymer is believed to be an ionic ring opening polymerization which converts the oxazine ring to another structure, e.g., linear polymer or larger heterocyclic rings.

U.S. 2010/312004 (Gorodisher et al.) describes benzoxazine-thiol adducts which may be cured to produce compositions useful in coatings, sealants, adhesives, and other applications. Similarly, U.S. Pat. No. 7,847,034 (Burns et al.) describes adducts useful for improving the toughness and curable compositions using such toughening adducts.

U.S. 2013-0209812 (Gorodisher et al.) describes a curable compositions comprising a benzoxazine component, a polyamine component and an ortho-dihydroxyaryl component and a multilayer article comprising the cured benzoxazine composition bonded to a fluoropolymer.

SUMMARY

The present disclosure is directed to a novel curable composition comprising a benzoxazine component, a polyamine component and a fluoropolymer component. Further, the present disclosure is directed to a method of preparing the adducts, which comprises reacting a benzoxazine compound with a primary or secondary polyamine component and fluoropolymer component. The compositions may be cured to produce cured compositions useful in coating, sealants, adhesive and many other applications. The present disclosure further provides a curable composition comprising a benzoxazine compound, a primary or secondary polyamine component and fluoropolymer component, which when cured is useful in adhesive, coating and bonding applications.

In some embodiments, the cured compositions are useful as a primer or adhesion-promoting layer for fluoropolymers, including fluoroelastomers. A substrate may be provided with a cured benzoxazine coating of this disclosure, then provided with a coating of a fluoropolymer. The fluoropolymer may be cured in situ to form a strong cohesive bond to the benzoxazine coating. In some embodiments a coating of the benzoxazine coating composition and a coating of the fluoropolymer may be simultaneously cured.

In other embodiments, the cured compositions are useful as corrosion-resistant coatings and have application where metal structures become subject to oxidative corrosion and ultimately fail to fulfill their intended purpose. Examples of failure by metal corrosion include deterioration of heat exchanger elements, corrosion of pipeline distribution systems and especially the gradual disintegration of steel used for reinforcing concrete structures such as bridge decks and frames which support a wide range of modern buildings. The instant benzoxazine compositions are particularly useful in providing corrosion protection to substrates exposed to high operating temperatures, such as in excess of 180° C.

In the process of preparing the benzoxazine adducts, the polyamine component comprises two or more amine equivalents, and each of the additional components may be mono- or higher functionality. The benzoxazine may be a mono- or higher benzoxazine. It will be understood that a primary amine has two amine equivalents and a secondary amine has one amine equivalents.

As used herein the term "benzoxazine" is inclusive of compounds and polymers having the characteristic benzoxazine ring. In the illustrated benzoxazine group, R is the residue of a mono- or polyamine.

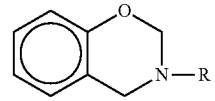

I where R represents a (hetero)hydrocarbyl groups, including (hetero)alkyl and (hetero)aryl groups.

As used herein, "alkyl" and "alkylene" mean the monovalent and divalent residues remaining after removal of one and two hydrogen atoms, respectively, from a linear or branched chain hydrocarbon having 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl. and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

"aryl" and "arylene" mean the monovalent and divalent residues remaining after removal of one and two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$.

Unless otherwise noted, alkyle, aryl and heteroaryl groups may be mono- or polyvalent.

As used herein "(hetero)hydrocarbyl" is inclusive of hydrocarbyl alkyl and aryl groups, and heterohydrocarbyl heteroalkyl and heteroaryl groups. Heterohydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero)hydrocarbyls as used herein include, but are not limited to methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

As used herein the term "residue" is used to define that (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of hexamethylene diamine, $H_2N$—$C_6H_{12}$—$NH_2$ is the divalent alkyl —$C_6H_{12}$—. The residue of phenylene diamine $H_2N$—$C_6H_4$—$NH_2$, is the divalent aryl —$C_6H_4$—. The residue of diamino-polyethylene glycol, $H_2N$—$(C_2H_4O)_{1-20}$—$C_2H_4$—$NH_2$, is the divalent (hetero) hydrocarbyl polyethylene glycol —$(C_2H_4O)_{1-20}$—$C_2H_4$—.

DETAILED DESCRIPTION

In the preparation of the benzoxazine-polyamine adducts, any benzoxazine compound may be used. Benzoxazines may be prepared by combining a phenolic compound, and aliphatic aldehyde, and a primary amine compound. U.S. Pat. No. 5,543,516 (Ishida), hereby incorporated by reference, describes a solventless method of forming benzoxazines. U.S. Pat. No. 7,041,772 (Aizawa et al.) describes a process for producing a benzoxazine resin which comprises the steps of reacting a phenol compound, an aldehyde compound and a primary amine in the presence of an organic solvent to synthesize a benzoxazine resin and removing generated condensation water and the organic solvent from a system under heating and a reduced pressure. Other suitable reaction schemes to produce mono-, di- and higher-functional benzoxazines are described in N. N. Ghosh et al., *Polybenzoxazine- new high performance thermosetting resins: synthesis and properties*, Prog. Polym. Sci. 32 (2007), pp. 1344-1391. One suitable method of producing the starting benzoxazine compounds is illustrated by the following reaction scheme:

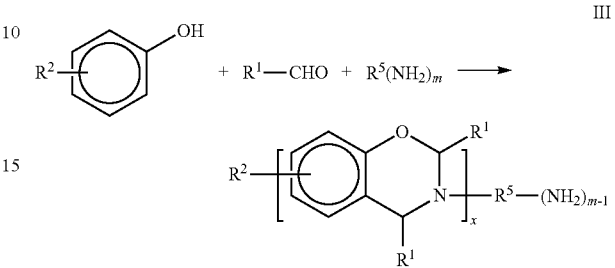

III wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-6; and
x is at least 1. It will be understood that the free amino groups depicted may further react to produce additional benzoxazine groups.

A monophenol is illustrated for simplicity. Mono- or polyphenolic compounds may be used. The phenolic compound may be further substituted without limitation is desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

With respect to the $R^2$ group of Formula III, numerous phenolic compounds are contemplated. $R^2$ may be an H, a covalent bond "—" which represents a biphenyl-type phenolic compounds, or $R^2$ may be a divalent aliphatic group linking aryl rings. For example, $R^2$ may be a divalent isopropyl group, derived from bisphenol-A, generally illustrated as follows:

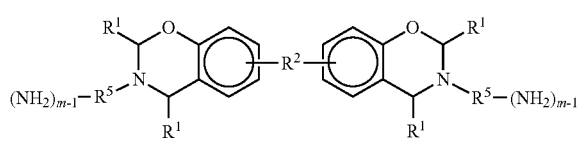

IV where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound, $R^5(NH_2)_m$, where m is 1-6. It will be understood that the free amino groups depicted may further react to produce additional benzoxazine groups.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol, 4-4'-methylene-di-phenol; 4-4'-dihydroxybenzophenone; bisphenol-A; 1,8-dihydroxyanthraquinone; 1,6-dihydroxynaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted, mono-, di-substituted or higher (hetero)hydrocarbyl amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl. It has been observed that benzoxazines derived from aromatic amines, such as aniline, are less reactive toward the thiol reactants than benzoxazines derived from aliphatic amines as indicated, for example by the corresponding reaction temperatures.

Amines useful in the preparation of the starting benzoxazine compounds include those of the formula:

$$R^5(NH_2)_m \quad \quad V$$

and include (hetero)hydrocarbyl monoamines and polyamines. $R^5$ may be (hetero)hydrocarbyl group that has a valence of m, and is the residue of a mono-, di- or higher amine having at least one primary amine group. $R^5$ can be an alkyl, a cycloalkyl or aryl and m 1 to 6. The $R^5$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polymeric polyoxyalkylene, polyester, polyolefin, poly(meth)acrylate, polystyrene or polysiloxane polymer having pendent or terminal reactive —$NH_2$ groups. Useful polymers include, for example, amine-terminated oligo- and poly-(diaryl)siloxanes and (dialkyl)siloxane amino terminated polyethylenes or polypropylenes, and amino terminated poly(alkylene oxides).

Any primary amine may be employed. Useful monoamines include, for example, methyl-, ethyl-, propyl-, hexyl-, octyl, dodecyl-, dimethyl-, methyl ethyl-, and aniline. The term "di-, or polyamine," refers to organic compounds containing at least two primary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro[5,5]undecane, and polyoxyethylenediamine. Useful diamines include N-methyl-1,3-propanediamine; N-ethyl-1,2-ethanediamine; 2-(2-aminoethylamino)ethanol; pentaethylenehexaamine; ethylenediamine; N-methylethanolamine; and 1,3-propanediamine.

Examples of useful polyamines include polyamines having at least three amino groups, wherein at least one of the three amino groups are primary, and the remaining may be primary, secondary, or a combination thereof. Examples include $H_2N(CH_2CH_2NH)_{1-10}H$, $H_2N(CH_2CH_2CH_2CH_2NH)_{1-10}H$, $H_2N(CH_2CH_2CH_2CH_2CH_2CH_2NH)_{1-10}H$, $H_2N(CH_2)_3NHCH_2CH=CHCH_2NH(CH_2)_3NH_2$, $H_2N(CH_2)_4NH(CH_2)_3NH_2$, $H_2N(CH2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn.

Many di- and polyamines, such as those just named, are available commercially, for example, those available from Huntsman Chemical, Houston, Tex. The most preferred di- or polyamines include aliphatic di- and triamines or aliphatic di- or polyamines and more specifically compounds with two or three primary amino groups, such as ethylene diamine, hexamethylene diamine, dodecanediamine, and the like.

Other useful amines include amino acids such as glycine, alanine, and leucine and their methyl esters, aminoalcohols such as ethanolamine, 3-aminopropanol, and 4-aminobutanol, polyaminoethers containing ethylene glycol and diethylene glycol (such as Jeffamine™ diamines), and alkenyl amines such as diallylamine and allylmethylamine.

For many embodiments, it is preferable that the amine of Formula V be selected from aromatic-containing amines, i.e. $R^5$ is an aryl, alkyaryl or aralkyl group. Such benzoxazine-polyamine adducts, where the polyamine has an aromatic groups, has generally performance when exposed to higher temperatures.

It will be understood that monoamines will cyclize with the aldehyde and phenolic compound to produce mono-benzoxazine compounds, while di- or higher amines will cyclize to produce di- and polybenzoxazine compounds: For example, a diamine (m=2 in the Scheme VI below) will produce a dibenzoxazine.

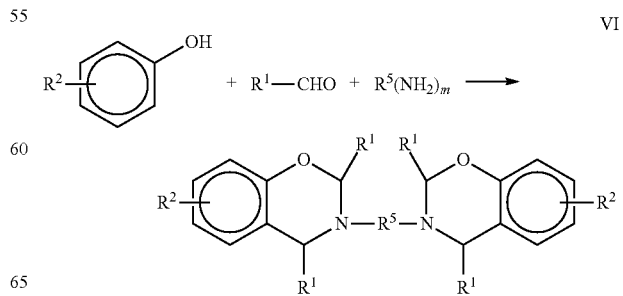

VI wherein each $R^1$ is H or an alkyl group, and $R^1$ is the residue of an aliphatic aldehyde;
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound and m is 2. It will be appreciated that subscript m=2 in Scheme VI, and additional amine and/or benzoxazine groups may be present.

If a polyamine and a polyphenol are used in the preparation, a polybenzoxazine will result. As used herein the term "polybenzoxazine" will refer to compounds having two or more benzoxazine rings. The term "poly(benzoxazine)" will refer to polymers resulting from acid-catalyzed ring-opening and homopolymerization of benzoxazine compounds.

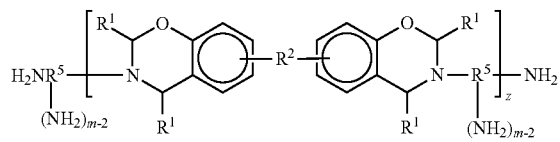

wherein,
each of $R^1$ is H or an alkyl group;
$R^2$ is a covalent bond, or a divalent (hetero)hydrocarbyl group;
m is 2-4;
z is at least 2;
$R^5$ is the divalent (hetero)hydrocarbyl residue of a primary diamino compound.

The benzoxazine ring is ring-opened by a polyamine compound. Useful amine compounds correspond to primary and secondary amines of the formula:

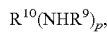 XII and include primary and secondary (hetero)hydrocarbyl monoamines and polyamines. $R^{10}$ may be (hetero)hydrocarbyl group that has a valence of p, and is the residue of a mono-, di- or higher amine having at least one primary amine group. $R^{10}$ can be a di- or higher-valent alkyl, a cycloalkyl or aryl, or combination thereof, including alkaryl and aralkyl, and p is 2 to 6. The $R^{10}$ is preferably selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen. Each $R^9$ is independently H or a hydrocarbyl group, including aryl and alkyl.

It will be clear to one skilled in the art that many of the same amines used in the preparation of the benzoxazines (supra) will also be useful in the ring-opening reaction. In many embodiments, it is preferred that the amine of Formula XII be an aromatic amine, including alkaryl and aralkyl. One particularly useful aromatic amine is diaminophenyl sulfone.

In some embodiments the polyamine compound may be selected from amidine compounds or guanidine compounds having at least two amine equivalents. These polyamines are generally slower reacting and require higher curing temperatures, similar to the aromatic amines. Such compounds are of the general formulae:

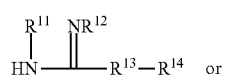 XV

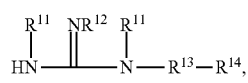 XVI wherein
each $R^{11}$ is independently an alkyl group of 1 to 14 carbon atoms, a cycloalkyl group of 3 to 12 carbon atoms, or an aryl group of 5 to 12 ring atoms,
each $R^{12}$ is H of $C_1$-$C_4$ alkyl;
each $R^{13}$ is a covalent bond, a $C_1$-$C_{12}$ alkylene or an arylene of 5 to 12 ring atoms, and $R^{14}$ is H or a functional group selected from amide, ester, nitrile, nitro, sulfide, sulfoxide, sulfone, disulfide, azide, isothiocyanate, amine, hydroxyl, mercaptan, ether, urethane, quaternary ammonium and phosphonium, halogen, silyl, silyloxy, and the like, wherein the functional groups requiring substituents are substituted with hydrogen or alkyl or aryl groups where appropriate. For example, if $R^{14}$ is an ether, the ether may be substituted with an $R^{13}$ goup to yield —O—$R^{13}$ group. If $R^{14}$ is an amide, the amide may be represented as —CO—N($R^{13}$)$_2$. One particularly useful amine of formula XV is cyanoguanidine (dicyandiamide).

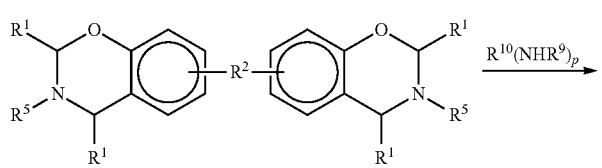

XIII

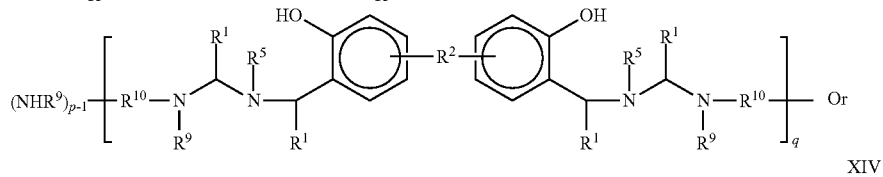

Or

XIV

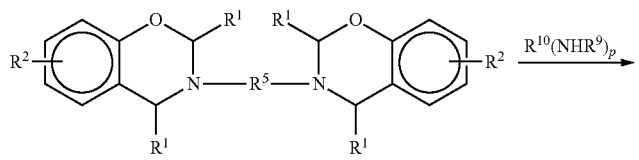

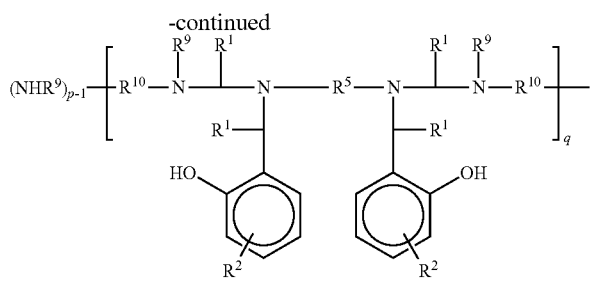

where
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the (hetero)hydrocarbyl residue of a primary amino compound
$R^{10}$ is the (hetero)hydrocarbyl group,
$R^9$ is H or a hydrocarbyl group, including aryl and alkyl,
p is 1 to 6;
q is at least 1, preferably at least 2.

In many embodiments the mixture of amine and benzoxazine compounds is used in amounts such that the molar ratio of amine equivalents to the benzoxazine groups is from 2:1 to 1:10, preferably 1:1 to 1:10 and more preferably 1:1 to 1:2. It will be understood that a primary amine has two molar equivalents and a secondary amine has one molar equivalent.

In some embodiments it is preferable to have an excess of benzoxazine, as an unreacted benzoxazine will homopolymerize to form a coextensive mixture or polymer network of benzoxazine/amine adduct and poly(benzoxazines), as illustrated below. In such embodiments, the molar amounts ratio of benzoxazine groups to the amine equivalents is about 1.1:1 to 50:1. Generally, benzoxazines derived from aromatic amines (R=aryl) are more ready homopolymerized than aliphatic amines. Superacids, such as pentafluoroantimonic acids may be used to effect the homopolymerization of the benzoxazines.

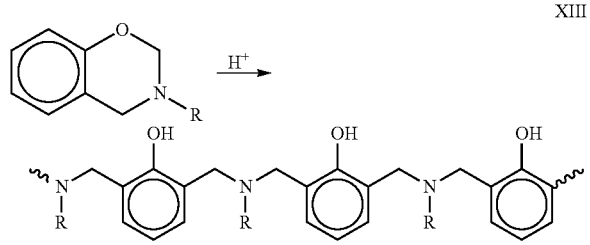

XIII

If desired an acid catalyst may be used to promote the ring-opening of the benzoxazine. Lewis and Brönsted acids accelerate the amine cure of benzoxazine adducts as indicated by the lower onset of polymerization temperature and reduced temperature of the peak of the exotherm corresponding to the cure. Suitable acid catalysts include, but are not limited to: strong inorganic acids such as hydrochloric acid, sulfuric acid, phosphoric acid, and the like; and organic acids such as acetic acid, para-toluene sulfonic acid, and oxalic acid. Acid catalysts may be used in amounts of 2 wt. % or less, preferably 1 wt. % or less, most preferably 0.5 wt. % or less, relative to the amounts of benzoxazine reactants.

The composition further comprises a fluoropolymer component, which may be used in amounts of 1 to 99 wt. % of the curable composition. In other words, the composition may comprise 1-99 wt. % fluoropolymer, and 99-1 wt. % of the mixture of benzoxazine and polyamine. In some preferred embodiments, the composition comprises 1-30 wt. % fluoropolymer, and 99-70 wt. % of the mixture of benzoxazine and polyamine. As previously described, the molar ratio of amine equivalents to the benzoxazine groups is from 2:1 to 1:10.

Suitable fluoropolymers include interpolymerized units derived from a fluorine-containing monomer and, preferably, and at least one additional monomer. Examples of suitable candidates for the principal monomer include perfluoroolefins (e.g., tetrafluoroethylene (TFE) and hexafluoropropylene (HFP)), chlorotrifluoroethylene (CTFE), perfluorovinyl ethers (e.g., perfluoroalkyl vinyl ethers and perfluoroalkoxy vinyl ethers), and optionally, hydrogen-containing monomers such as olefins (e.g., ethylene, propylene, and the like), and vinylidene fluoride (VDF). Such fluoropolymers include, for example, fluoroelastomer gums and semi-crystalline fluoroplastics.

When the fluoropolymer is perhalogenated, preferably perfluorinated, it contains at least 50 mole percent (mol %) of its interpolymerized units derived from TFE and/or CTFE, optionally including HFP.

When the fluoropolymer is not perfluorinated, it contains from about 5 to about 90 mol % of its interpolymerized units derived from TFE, CTFE, and/or HFP, from about 5 to about 90 mol % of its interpolymerized units derived from VDF, ethylene, and/or propylene, up to about 40 mol % of its interpolymerized units derived from a vinyl ether.

Suitable perfluorinated vinyl ethers include those of the formula.

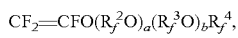  XIV where $R_f^2$ and $R_f^3$ are the same or are different linear or branched perfluoroalkylene groups of 1-6 carbon atoms; a and b are, independently, 0 or an integer from 1 to 10; and $R_f^4$ is a perfluoroalkyl group of 1-6 carbon atoms.

A preferred class of perfluoroalkyl vinyl ethers includes compositions of the formula:

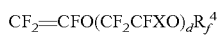  XV wherein X is F or $CF_3$; d is 0-5, and $R_f^4$ is a perfluoroalkyl group of 1-6 carbon atoms.

Most preferred perfluoroalkyl vinyl ethers are those where, in reference to either Formula (XIV) or (XV) above, d is 0 or 1, and $R_f^2$, $R_f^3$, and $R_f^4$ contains 1-3 carbon atoms. Examples of such perfluorinated ethers include perfluoromethyl vinyl ether, perfluoroethyl vinyl ether, and perfluoropropyl vinyl ether.

Other useful perfluorinated monomers include those compounds of the formula:

$$CF_2=CFO[(CF_2)_e(CFZ)_g)]_hR_f^4, \quad \text{XVI}$$

Where $R_f^4$ is a perfluoroalkyl group having 1-6 carbon atoms, e is 1-5, g is 0-5, h is 0-5 and Z is F or $CF_3$. Preferred members of this class are those in which $R_f^4$ is $C_3F_7$, e is 1 or 2, g is 0 or 1, and h is 1.

Additional perfluoroalkyl vinyl ether monomers useful in the invention include those of the formula: $CF_2=CFO[(CF_2CCF(CF_3)O)_k(CF_2)_pO(CF_2)_q]C_rF_{2r+1}$, XVII, where k is 0-10, p is 1-6, q is 0-3, and r is 1-5. Preferred members of this class include compounds where k is 0 or 1, p is 1-5, q is 0 or 1, and r is 1.

Perfluoroalkoxy vinyl ethers useful in the invention include those of the formula: $CF_2=CFO(CF_2)_t[(CF(CF_3)]_uO(CF_2O)_wC_rF_{2r+1}$, XVIII;
wherein t is 1-3, u is 0-1, w is 0-3, and r is 1-5, preferably 1. Specific, representative, examples of useful perfluoroalkoxy vinyl ethers include $CF_2=CFOCF_2OCF_3$, $CF_2=CFOCF_2OCF_2CF_2CF_3$, $CF_2=CFO(CF_2)_3OCF_3$, and $CF_2=CFO(CF_2)_2OCF_3$. Mixtures of perfluoroalkyl vinyl ethers and perfluoroalkoxy vinyl ethers may also be employed.

Perfluoroolefins useful in the invention include those of the formula: $CF_2=CF—R_f^5$, where $R_f^5$ is fluorine or a perfluoroalkyl of 1 to 8, preferably 1 to 3, carbon atoms.

In addition, partially-fluorinated monomers or hydrogen-containing monomers such as olefins (e.g., ethylene, propylene, and the like), and vinylidene fluoride can be used in the fluoropolymer of the invention, when the fluoropolymer is not perfluorinated. One example of a useful fluoropolymer is composed of principal monomer units of tetrafluoroethylene and at least one perfluoroalkyl vinyl ether. In such copolymers, the copolymerized perfluorinated ether units constitute from about 10 to about 50 mol % (more preferably 15 to 35 mol %) of total monomer units present in the polymer.

The fluoropolymers, including fluoroelastomers, may include a cure-site monomer component to facilitate cure in the presence of a catalyst. The cure site component allows one to cure the fluoropolymer. The cure site component can be partially or fully fluorinated. At least one cure site component of at least one fluoropolymer comprises a nitrogen-containing group. Examples of nitrogen-containing groups useful in the cure site monomers of the present invention include nitrile, imidate, amidine, amide, imide, and amine-oxide groups. Useful nitrogen-containing cure site monomers include nitrile-containing fluorinated olefins and nitrile-containing fluorinated vinyl ethers, such as those described in U.S. Pat. No. 6,890,995 (Kolb et al.), incorporated herein by reference.

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the fluoropolymer components mentioned above are combined with a suitable fluorinated cure site monomer. Such a monomer can be selected, for example, from the general formula Z—$R_f$—$O_x$—$CF=CF_2$, wherein Z is Br or I, $R_f$ is a substituted or unsubstituted $C_1$-$C_{12}$ fluoroalkylene, which may be perfluorinated and may contain one or more ether oxygen atoms, and x is 0 or 1. When x is 0, examples of the bromo- or iodo-fluoroolefins include: bromodifluoroethylene, bromotrifluoroethylene, iodotrifluoroethylene, 1-bromo-2,2-difluoroethylene, and 4-bromo-3,3,4,4-tetrafluorobutene-1, and the like. When x is 1, examples of the bromo- or iodo-fluorovinyl ethers include: $BrCF_2OCF=CF_2$, $BrCF_2CF_2OCF=CF_2$, $BrCF_2CF_2CF_2OCF=CF_2$, $CF_3CF(Br)CF_2OCF=CF_2$, and the like. In addition, non-fluorinated bromo- or iodo-olefins, e.g., vinyl bromide and 4-bromo-1-butene, can be used.

The amount of cure site component in a side chain position of the fluoropolymer is generally from about 0.05 to about 5 mol % (more preferably from 0.1 to 2 mol %). The fluoroelastomers having a cure site monomer component may be cured by the steps of: a) forming a mixture comprising a fluoropolymer having interpolymerized units derived from cure site monomer, and an onium catalyst; b) shaping the mixture; c) curing the shaped mixture; and optionally d) heat aging the cured mixture.

In some embodiments, it is believed that the benzoxazine composition (comprising the benzoxazine component, and the polyamine component) forms covalent bonds with the fluoropolymer, promoting adhesion between the two phases and inhibiting phase separation. As the benzoxazine composition is cured, the phenol (resulting from ring-opening of the benzoxazine by the polyamine), or an amino group, can add to a double bond of the fluoropolymer by addition-dehydrofluorination.

In some embodiments, fluoropolymers that facilitate addition of the benzoxazine are preferred. One such group of fluoropolymers are those containing a cure site monomer. Another such group include those that may be dehydrofluorinated, such as fluoropolymers having vinylidine fluoride, or other fluorinated monomers with ethylene and/or propylene as comonomers, such as HFP/ethylene. Such fluoropolymers that may be dehydrofluorinated contain hydrogen and fluorine on adjacent carbon atoms in the polymer chain (—CH—CF—).

The composition may include additional optional materials such as reinforcement-grade (reinforcing) filler materials, fluoroplastics in addition to fluoroelastomers, pigments, energy-beam absorbents, antioxidants, stabilizing agents, fillers, oils, processing aids, neutralizers, rheology modifiers, silane coupling agents, flow control agents cross-linking materials (e.g., cross-linking agents, cross-linking co-agents, and cure accelerators), lubricants, flame retardants, flame retardant synergists, antimicrobials, any other additive known in the art, and any combination of these in any proportion.

The concentration of these additional materials in the elastomeric composition of the present invention may be any concentration sufficient to provide a desired result. Generally fillers may be used in amounts of 1 to 50 parts by weight, preferably 10 to 25 parts by weight, relative to 100 parts by weight of the curable benzoxazine (benzoxazine and polyamine).

Reinforcement-grade (reinforcing) filler material may optionally be included in the fluoropolymer composition to enhance the split and tear properties of cold shrinkable articles (formed from the elastomeric composition) at elevated temperatures. Examples of suitable filler materials include silica-based reinforcement filler, reinforcement-grade carbon black, fluoroplastics, clays, and any combination of any of these in any proportions.

As used herein, the term "silica-based reinforcement filler" is defined to include all compounds of the formula $SiO_2$ (e.g., pure silica); all compositions that include at least about ten weight percent of $SiO_2$ and/or an $SiO_2$ derivative, based upon the total weight of the composition; all silicates; and any combination of any of these in any proportion. Examples of suitable silica-based reinforcement fillers include silica (also referred to as silicon dioxide); silane-treated silica; fumed silica (e.g., such as the CABOSIL™ M-5 product commercially from Cabot Corporation of Billerica, Mass.); silane-treated fumed silica such as, for example, the AEROSIL™R972 product, the AEROSIL™ R974 product, and the AEROSIL™200 product that are all commercially available from Degussa Company of Parsippany, N.J. and the CABOSIL™ line of silane-treated fumed silica products commercially from Cabot Corporation of Billerica, Mass.; silicates; and any combination of any of these in any proportion.

Examples of suitable silicates include calcium silicate (wollastonite), aluminum silicate, feldspars and mixtures of these. In some embodiments, the average particle size of the silica-based reinforcement filler may be less than about 30 nanometers (nm).

Glasses may be used, including fiberglass filament and mats. In other embodiments, the average particle size of the silica-based reinforcement filler may be as low as about 10 nm and as high as about 20 nm.

The phrase "reinforcement-grade carbon black" as used herein, includes any carbon black with an average particle size smaller than about 10 microns. Some particularly suitable average particle sizes for reinforcement-grade carbon black range from about 9 nm to about 40 nm. Carbon black that is not reinforcement grade include carbon black with an average particle size larger than about 40 nm. Carbon fibers and carbon nanotubes are also useful fillers. Carbon black fillers are typically employed in fluoropolymers as a means to balance, elongation, hardness, abrasion resistance, conductivity, and processibility of the compositions. Suitable examples include MT blacks (medium thermal black) designated N-991, N-990, N-908, and N-907; FEF N-550; and large particle size furnace blacks.

Other useful fillers include diatomaceous earth, barium sulfate, talc, calcium carbonate, calcium fluoride, titanium oxide, and iron oxide.

The curable composition may further comprise an ortho-dihydroxyaryl component, which include monocatechols or polycatechols. "Polycatechol" molecules containing more than one o-dihydroxyaryl moiety, the moieties being connected by an organic connecting link which does not provide electronic interaction between the moieties, such as a saturated organic group (e.g., alkyl, cycloalkyl). This group includes bis-catechols. It has been found that the addition of such compounds to the curable benzoxazine composition significantly enhances the adhesion of the composition to substrates. It is believed that such compounds function as chelating agents on metal substrates. The ortho-dihydroxy aryl component is present between 0.5 and 20 parts by wt of the relative to 100 parts by weight of the benzoxazine and polyamine, most pref. 1 to 10 parts by weight.

Useful monocatechols are of the formula:

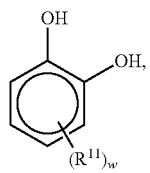

where each $R^{11}$ is independently H, or an $C_1$-$C_{12}$ alkyl or aryl, and w is 0 to 4.

Examples of suitable ortho-dihydroxyaryl compounds useful in the curable composition include but are not limited to those selected from the group consisting of catechol and substituted catechols. Examples of suitable substituents include alkyl alkoxy, aryl, halogen, and other substituents which would not interfere with the reaction. Specific examples include methylcatechols, (tert)butylcatechols, ethylcatechols, isopropylcatechols, butylcatechols, (tert)butylcatechols, amylcatechols, (tert)amylcatechols, benzylcatechols, phenethylcatechols, phenylcatechols, fluorocatechols, chlorocatechols, bromocatechols, methoxycatechols, ethoxycatechols, formylcatechols, allylcatechols, ortho-dihydroxynaphthalenes. Other useful ortho-dihydroxyaryl compounds include 1,2- and 2,3-dihydroxynapthalene, and the corresponding higher ortho-dihydroxyaryl compounds.

The ortho-dihydroxyaryl compounds may also include oligomers and polymers having ortho-dihydroxyaryl groups. This includes novolak resins derived from a catechol, an aldehyde such as formaldehyde, and an optional monophenol. Reference may be made to U.S. Pat. No. 5,559,513 (Kirk et al.)m incorporated herein by reference.

Molecules containing more than two catechol groups are also acceptable, as long as the connecting linkage between the catechols meets the above requirements. Thus in formulae IV, and V oligomers or polymers are illustrated which are useful in this invention

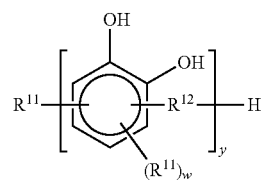

IV where each $R^{11}$ is independently H, or an $C_1$-$C_{12}$ alkyl or aryl, w is 0 to 4; and
$R^{12}$ is a divalent hydrocarbyl group, and
y is at least 2.
Or

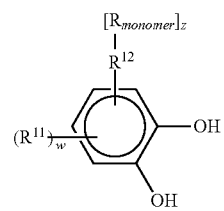

V

Where each $R^{11}$ is independently H, or an $C_1$-$C_{12}$ alkyl or aryl, w is 0 to 4;
$R^{12}$ is a divalent hydrocarbyl group,
z is at least 2, and
$R_{monomer}$ a unit in a polymer chain chosen from hydrocarbons, alkyd, acrylic, polyester, phenol-formaldehyde resins etc.

A number of bis-catechols are available commercially e.g., nordihydroguaiaretic acid. Other useful catechol are disclosed in U.S. Pat. No. 4,902,667 (Whitcomb), incorporated herein by reference.

The benzoxazine composition may further comprise an epoxy resin, which may improved the processability of the cured coatings. Polyepoxy compounds which can be utilized in the composition of the invention include both aliphatic and aromatic polyepoxides, but glycidyl aliphatic epoxides are preferred. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the invention include 3',4'-epoxycyclohexylmethyl-3,4-epoxycyclohexanecarboxylate, 3,4-epoxycyclohexyloxirane, 2-(3',4'-epoxycyclohexyl)-5, 1H-spiro-3H4H-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the composition of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxy)phenyl)propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 and 3,298,998, as well as the derivatives described in the Handbook of Epoxy Resins by Lee and Neville, McGraw-Hill Book Co., New York (1967), and mixtures thereof.

A preferred class of polyepoxy compounds are polyglycidyl ethers of polyhydric alcohol, particularly polyphenols. The glycidyl epoxy compounds are generally more reactive toward amines than cycloaliphatic epoxy compounds. In some preferred embodiments, the epoxy compound generally has an epoxy equivalent weight (EW) of between 170 to about 4,000, preferably between 170 and 1,000. The epoxide equivalent weight (EW) is defined as the weight in grams of the epoxy functional compound that contains one gram equivalent of epoxy (oxirane) functional groups.

Epoxy resins may be compounded with the benzoxazine component in amounts of 5 to 25% molar equivalents of epoxy functional groups to moles of benzoxazine functional groups.

Adjuvants may optionally be added to the compositions such as colorants, abrasive granules, anti-oxidant stabilizers, thermal degradation stabilizers, light stabilizers, conductive particles, tackifiers, flow agents, bodying agents, flatting agents, inert fillers, binders, blowing agents, fungicides, bactericides, surfactants, plasticizers, rubber tougheners and other additives known to those skilled in the art. They also can be substantially unreactive, such as fillers, both inorganic and organic. These adjuvants, if present are added in an amount effective for their intended purpose.

Examples of suitable filler materials include silica-based fillers, reinforcement-grade carbon black, clays, and any combination of any of these in any proportions. Such fillers are described in more detail below.

In some embodiments, a toughening agent may be used. The toughening agents which are useful in the present invention are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski), incorporated herein by reference. Preferable rubbery backbones comprise polymerized butadiene or a polymerized mixture of butadiene and styrene. Preferable shells comprising polymerized methacrylic acid esters are lower alkyl ($C_1$-$C_4$) substituted methacrylates. Preferable monovinyl aromatic hydrocarbons are styrene, alphamethylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below about 0° C., such as polybutyl acrylate or polyisooctyl acrylate to which is grafted a polymethacrylate polymer (shell) having a glass transition above about 25° C., such as polymethylmethacrylate.

The third class of toughening agents useful in the invention comprises elastomeric particles that have a glass transition temperature ($T_g$) below about 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with coreactive difunctional hydrogen compounds such as diols, diamines, and alkanolamines.

Useful toughening agents include core/shell polymers such as methacrylate-butadiene-styrene (MBS) copolymer wherein the core is crosslinked styrene/butadiene rubber and the shell is polymethylacrylate (for example, ACRYLOID KM653 and KM680, available from Rohm and Haas, Philadelphia, Pa.), those having a core comprising polybutadiene and a shell comprising poly(methyl methacrylate) (for example, KANE ACE M511, M521, B11A, B22, B31, and M901 available from Kaneka Corporation, Houston, Tex. and CLEARSTRENGTH C223 available from ATOFINA, Philadelphia, Pa.), those having a polysiloxane core and a polyacrylate shell (for example, CLEARSTRENGTH S-2001 available from ATOFINA and GENIOPERL P22 available from Wacker-Chemie GmbH, Wacker Silicones, Munich, Germany), those having a polyacrylate core and a poly(methyl methacrylate) shell (for example, PARALOID EXL2330 available from Rohm and Haas and STAPHY- LOID AC3355 and AC3395 available from Takeda Chemical Company, Osaka, Japan), those having an MBS core and a poly(methyl methacrylate) shell (for example, PARALOID EXL2691A, EXL2691, and EXL2655 available from Rohm and Haas); and the like; and mixtures thereof. Preferred modifiers include the above-listed ACRYLOID and PARALOID modifiers; and the like; and mixtures thereof.

The toughening agent is useful in an amount equal to about 3-35%, preferably about 5-25%, based on the weight of the benzoxazine. The toughening agents of the instant invention add strength to the composition after curing without reacting with the benzoxazine or interfering with curing.

The curable benzoxazine/polyamine/fluoropolymer compositions are useful for coatings, foams, shaped articles, adhesives (including structural and semistructural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, as primers or adhesion-promoting layers, and other applications that are known to those skilled in the art. When uncured or partially cured, the benzoxazine compositions exhibit pressure-sensitive adhesive properties, including tack. In some embodiments, the present disclosure provides a coated article comprising a substrate, having a cured coating of the benzoxazine thereon.

The compositions may be coated onto substrates at useful thicknesses ranging from 25-1000 micrometers or more. Coating can be accomplished by any conventional means such as roller, dip, knife, or extrusion coating. Solutions of the curable composition may be used to facilitate coating. Stable thicknesses may be necessary to maintain the desired coating thickness prior to curing of the composition by heat and/or acid catalysis.

The benzoxazine composition may also be powder coated by partially curing the benzoxazine compositions, crushing or grinding the partially cured composition to a suitable particle size and fusing to a heated substrate. The powder coatings are prepared by well known methods basically through the steps of pre-mixing the ingredients, melt extrusion of the blend and pulverization. The extruder is preferably a twin screw extruder for this process. The powder is applied by conventional powder coating techniques. Non-limiting examples of powder coating techniques include electrostatic spray coating and fluidized bed coating.

In some embodiments the powder coating may be sprayed onto a heated substrate to fuse and further cure the composition. Electrostatic spray is a useful process for applying powder coatings. An electrostatic spray gun consists essentially of a tube to carry airborne powder to an orifice with an electrode located at the orifice. The electrode is connected to a high-voltage (about 5-100 kv), low-amperage power supply. As the powder particles come out of the orifice they pass through a cloud of ions, called a corona and pick up a negative or positive electrostatic charge. The object to be coated is electrically grounded. The difference in potential attracts the powder particles to the surface of the part. They are attracted most strongly to areas that are not already covered, forming a reasonably uniform layer of powder even on irregularly shaped objects.

The particles cling to the surface strongly enough and long enough for the object to be conveyed to a baking oven, where the powder particles fuse to form a continuous film, flow, and further cured. The powder particles that do not adhere to the object to be coated (overspray) can be recovered and recycled, typically, by blending with virgin powder.

In another embodiment the powder coating may be applied by dipping the heated substrate into a fluidized bed or into a molten composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

The cured benzoxazine composition may be used as an anticorrosion coating to protect metal substrates. Coatings used to protect metals against corrosion are required to meet several important criteria. They must be durable so as to avoid damage to the coated product during transportation or storage and they must not craze or crack or otherwise fail when subjected to bending or other forms of distortion. Coatings for metals are well known in the art. They possess excellent abrasion and impact resistance and can be formulated to aggressively adhere to cleaned metal surfaces. Further, they have been found to survive most of the exacting conditions for corrosion protection coatings. However, until recently, even these suffered from insufficient flexibility. This resulted in the need for on-site repair, of gaps or voids in the coating, following installation of protected metal structures.

Commonly used protective coatings of the prior art may be prepared by reacting and subsequently curing them with appropriate curing agents. Coatings of this type are suitably durable for the majority of applications; however, they are likely to fail if coated metal substrates, such as metal plate, reinforcing rod or pipes are subjected to bending, high temperatures or other forms of distortion. Failure occurs when the coatings crack and provide a channel of access by water or other contaminants which attack the underlying metal.

In one aspect, the present invention provides a coated article comprising a metal substrate comprising a coating of the uncured, partially cured or fully cured benzoxazine composition on at least one surface thereof. The coating composition can be coated on one or both surfaces of the metal substrate and can comprise additional layers, such as bonding, tying, protective, and topcoat layers. The metal substrate can be, for example, at least one of the inner and outer surfaces of a pipe, vessel, conduit, rod, profile shaped article, or tube. The compositions are useful in providing a corrosion protected pipe, vessel, conduit, rod, profile shaped article, or tube that transport or are exposed (on any surface) to fluids at different temperatures and pressures and having different chemical compositions. Layers of the coating can provide corrosion protection to the metal substrate and act as a thermal insulator. Protected articles of the invention also have resistance to chipping (on impact), are flexible enough to allow for bending of the substrate without cracking or delamination, and have improved abrasion resistance. Multilayers of the coating can be coated individually in sequence or simultaneously.

Unexpectedly, the cured benzoxazine layer provides an excellent protective layer, even at elevated temperatures, when coated directly onto a metal surface, such as a steel pipe. Metal surfaces coated with cured benzoxazine composition layers having a dried thickness in the range of 0.02 mm to 300 mm, preferably in the range of 0.5 mm to 5 mm, show superior impact resistance and superior cohesion compared to known conventional coated metal pipes, vessels, conduits, profile shaped articles, rods, or tubes.

Additionally, the cured compositions are advantageous over conventional coatings on metal surfaces in that the benzoxazine compositions have strong bonding ability to without requiring the use of intervening adhesive layers. For example, in some embodiments a pipe, vessel, conduit, rod, profile shaped article, or tube can be directly coated with an benzoxazine composition layer and then optionally overcoated with a thermoplastic topcoat protective/insulative layer, thus providing a two-layer system on a metal substrate showing excellent adhesion to the metal surface and excellent cohesion of the coated layers. This system provides processing and economic advantages. Also, the article of the present invention comprising the benzoxazine coating exhibits improved cathodic disbandment performance at elevated temperatures and impact resistance compared to conventional thermoplastic or thermosetting polymer coated metal substrates. There has been achieved better interlayer adhesion than is known in the art for similar articles.

The benzoxazine coating composition (comprising the benxoxazine, polyamine, fluoropolymer and other optionally additives) is particular useful as an adhesion promoter or binding layer for fluoropolymer coatings. Fluoropolymers include, for example, crosslinked fluoroelastomers and semicrystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers such as hexafluoropropylene, have particular utility in high temperature applications such as seals, gaskets, and linings.

Multi-layer constructions containing a fluoropolymer enjoy wide industrial application. Such constructions find utility, for example, in fuel line hoses and related containers and hoses or gaskets in the chemical processing field. Adhesion between the layers of a multi-layered article may need to meet various performance standards depending on the use of the finished article. However, it is often difficult to establish high bond strengths when one or more of the layers is a fluoropolymer, in part, because of the non-adhesive qualities of fluoropolymers. Various methods have been proposed to address this problem. One approach is to use an adhesive layer or tie layer between the fluoropolymer layer and the second polymer layer. Surface treatments for the fluoropolymer layer, including the use of powerful reducing agents (e.g., sodium naphthalide) and corona discharge, have also been employed to enhance adhesion. In the case of fluoropolymers containing interpolymerized units derived from vinylidene fluoride, exposure of the fluoropolymer to a dehydrofluorinating agent such as a base has been used, as well as polyamine reagents applied to the fluoropolymer surface or incorporated within the fluoropolymer itself. A need still exists for simple, effective means to bond to fluoropolymer containing materials, particularly in a multi-layer constructions.

The substrate can include a metal or a fluorinated or non-fluorinated polymer, such as a thermoplastic polymer or a thermoplastic elastomer, glass or ceramics. The non-fluorinated polymer can be a nitrile rubber, an ethylene-propylene-diene monomer rubber, an epichlorohydrin rubber, an ethylene-acrylate copolymer rubber, a polyamide, a polyurethane, a polyolefin, or combinations thereof.

In another embodiment this disclosure provides a multi-layer article includes a first fluoropolymer layer, a substrate, and a benzoxazine bonding layer (comprising the cured benzoxazine and fluoropolymer) on a surface of the first fluoropolymer layer and in contact with the substrate. The substrate can include a non-fluorinated polymer, a fluoropolymer, or a metal.

The benzoxazine bonding layer provides not only excellent adhesion to the fluoropolymer and substrates, but can also improve sealing of connector parts, joints or gaskets and can increase the amount of force needed to separate the fluoropolymer layer and connector parts or joints.

Improved adhesion between a fluoropolymer layer and a benzoxazine layer can arise from coating the fluoropolymer from a fluoropolymer solution. Fluoropolymer solution can provide excellent adhesion between the fluoropolymers and substrates such as metal and can improve the sealing from connector parts or joints or gaskets. Excellent interlayer adhesion of fluorine-containing polymer such as copolymer of ethylene and tetrafluoroethylene (ETFE) and a terpolymer of tetrafluoroethylene, hexafluoropropylene and vinylidene fluoride (THV) to metallic substrates such as stainless steel can be obtained using the benzoxazine composition. The multilayer articles can have unexpected improved interlayer adhesion and sealing or pull-off force between the fluoropolymer inner layer and connector parts.

In preparing a multilayer article comprising a substrate, a fluoropolymer layer and the benzoxazine tie- or bonding layer disposed therebetween, the benzoxazine coated substrate is then contacted with a fluoropolymer compound. The compounded fluoropolymer or perfluoroelastomer may be in the form of a film, crumb, cord, preform, or powder. The fluoropolymer compound-covered substrate (fluoropolymer compound/benzoxazine tie layer/substrate) is then heated to a temperature sufficient to cure or fuse the fluoropolymer layer, and is generally at least 100° C. The fluoropolymer compound-covered substrate may be heated in a mold to form a cured and bonded fluoropolymer article. The heating of the fluoropolymer compound-covered substrate cures the fluoropolymer and the benzoxazine curable composition and bonds the layers together to form a bonded multilayered article.

The composition of the present disclosure between the fluoropolymer or perfluoroelastomer compositions and other substrates, when exposed to elevated temperatures, such as for example temperatures of at least 200° C. and maintains adhesive integrity.

In one embodiment, a coating is prepared by coating a substrate with an uncured, partially cured or fully cured benzoxazine composition (comprising the benzoxazine, the polyamine and fluoropolymer), and curing under heat and pressure. As used herein, the term "substrate" means any material suitable for bonding to fluoropolymers such as fluoroelastomers or perfluoroelastomers. Substrates include, for example, various metals (such as for example, aluminum or stainless steel), polymers (such as non-fluorinated and fluorinated, plastics and elastomers), carbon fibers, ceramics (such as glass) and combinations thereof. The polymer substrates include polymers that are stable up to the curing temperature(s) of the curable benzoxazine composition and include for example, perfluorinated and partially fluorinated polymers, polyimides, etc. The primer composition may be applied to the substrate by techniques known in the art, including for example, dipping, spray coating, pouring, and other methods known in the art.

In some embodiments, a stagable coating composition which may be partially cured at a first temperature, the subsequently cured at a second, elevated temperature. It has been observed that aromatic polyamines (or those of Formulas XV-XVI) and aliphatic polyamines have different reactivities toward the benzoxazine component. Aromatic amines, such as aniline, and those of Formulas XV-XVI, are less reactive toward the benzoxazine component than aliphatic amines. A stagable, curable composition may be prepared by using a mixture of aromatic polyamines (or those of Formulas XV-XVI) and an aliphatic polyamines, for example, using a mixture of a) 10 to 90 mole % of said aryl polyamines (or those of Formulas XV-XVI) and b) 10 to 90 mole % of said aliphatic polyamines. The curable composition may then be cured at a first temperature at which the aliphatic polyamine react with the benzoxazine component, and then subsequently at a second temperature where the remaining aromatic polyamines, or those of Formulas XV-XVI, reacts with the benzoxazine component.

The present disclosure provides stagable compositions comprising a blend or mixture of fluoropolymer, benzoxazine compounds (including those derived from an aromatic amine and/or benzoxazine compounds derived from an aliphatic amine), and a mixture or aliphatic and aromatic polyamines (or those of Formulas XV-XVI). The stagable composition may further comprise an acid catalyst and other additives, as previously described. The stagable composition may be coated on to an adherend or substrate, partially cured at a first temperature and then fully cured at a second temperature.

Upon combining the components at a first temperature, the benzoxazine compounds will preferentially react with the aliphatic polyamine to form a partially cured mixture. This partially cured mixture may be tacky or non-tacky at room temperature. On heating to an elevated temperature, the benzoxazine will react with the remaining aromatic polyamine (or those of Formulas XV-XVI) to produce a fully cured composition.

The physical properties (e.g. viscosity, tack, peel, shear) of the uncured, B-staged, and cured compositions to be readily altered through the use of different amounts of each component: the aromatic or aliphatic polyamine, the benzoxazine compounds derived from an aromatic amine and benzoxazine compounds derived from an aliphatic amine, or through the use of different species of the three components.

In some embodiments, the partially cured, stagable composition may be disposed between two substrates (or adherends), and subsequently heated to fully cure the adhesive and effect a structural or semistructual bond between the substrates. In other embodiments, the stagable composition may be heated to a flowable viscosity to effect coating of a substrate, which may then be joined to a second substrate while still molten and full curing effected.

In some embodiments, the present disclosure provides a method of assembling components using a thermally B-staged, further thermally curable, benzoxazine-based compositions. In some embodiments, the thermal B-stage is accomplished by mild heating to promote partial reaction of the components of the stagable adhesive such that the viscosity increases sufficiently to allow coating. The thermal B-stage is followed by a thermal cure at a higher temperature. In some embodiments, the compositions of the present disclosure are useful for rapid assembly. The compositions of the present disclosure are particularly useful in assembly operations in which the composition desirably is colored or even opaque to a degree which would be difficult to attain in a system which is B-staged photochemically, for example by UV radiation, where the materials to be joined are opaque, or in which the required adhesive thickness is too great for easy photochemical curing.

"Mild heating" refers to heating the composition to a first temperature which is sufficient to initiate a chemical reaction between the components (in particular the benzoxazine derived from the aliphatic amine) to effect a combination of reaction to increase the viscosity of the composition to a desirable level for the B-stage. In some embodiments, the first temperature will be selected to be high enough to prevent premature viscosity increases prior to application to a substrate. In some embodiments, it may be desirable to store the adhesive composition at or below the first initiation temperature. In other embodiments it would be protect the composition from exposure to temperatures above about 80° C. prior to application to the substrate. The first temperature will be lower than a second, higher temperature which is necessary to significantly initiate a secondary reaction between the adhesive components, i.e. the reaction of the polyamine compound with the benzoxazine derived from an aromatic amine. In some embodiments, the temperature at which the composition is B-staged will be greater than about 90° C. In other embodiments, the temperature at which the adhesive composition is B-staged will be less than about 120° C.

It will be appreciated by those of skill in the art that the specific temperatures associated with the terms "first temperature" and "second, higher temperature" will, of necessity, depend upon the chemical components of a specific embodiment of the compositions of the invention and the properties of the materials to be bonded or adhered by the composition, the difference between the first, lower temperature and the second, higher temperature will generally be such that exposure to the first temperature is sufficient to produce the B-stage composition without significant advancement of the final cure mechanism or mechanisms.

In some embodiments, the difference between the first temperature and the second, higher temperature will be at least about 25° C., preferably at least about 30° C. In other embodiments, the difference between the first temperature and the second, higher temperature will be no more than about 100° C., preferably no more than about 75° C. If the difference between the first, lower temperature and the second, higher temperature is too small, it may be difficult to limit the onset of the higher temperature cure reaction or reactions. If the difference between the first, lower temperature and the second, higher temperature is too large, the energy demands of the overall process may be undesirably high and damage to one or both of the materials to be joined may result.

In some preferred embodiments, the final thermal cure mechanism is a relatively slow reaction at the first temperature compared to the B-staging reaction that initially increases the viscosity of the resin. The relatively slower kinetics of this mechanism allow the same generic triggering event, heating, to initiate both reactions so that the composition is B-staged and of sufficient viscosity for coating immediately after initial heating to a first temperature, but which does not fully cure until a later time at a second, higher temperature, allowing time for the substrate and adherent to be properly aligned before curing is complete.

In some embodiments, the B-staged composition preferably is tacky enough to hold the substrate and adherent in place during the thermal cure without requiring known additional clamping means. In some embodiments, a final thermal cure at a second, higher temperature takes at least about 0.1 hours, preferably at least about 0.25 hour. In other embodiments, the final thermal cure requires no more than about 0.75 hours at the second, higher temperature, preferably no more than about 1.5 hours, to complete, allowing adequate time after initial heating to ensure that there is adequate contact between the adhesive composition, the substrate, and the adherent. In some embodiments, longer final thermal cure times at lower second, higher temperatures may be acceptable or even desirable.

Generally the benzoxazine, the polyamine, the fluoropolymer and other optional ingredients (as previously described) are combined and heated to effect mixing and initiate polymerization. In another stagable embodiment, the benzoxazine, and aromatic polyamine or the polyamines of Formulas XV or XVI are combined with the fluoropolymer and mildly heated to provide a homogenous mixture, suspension or solution, then subsequently combined with a higher reactivity aliphatic polyamine to initiate polymerization between the aliphatic polyamine and the benzoxazine. The partially polymerized mixture is then heated to a second, higher temperature to effect further polymerization with the aromatic polyamine (or the polyamines of Formulas XV or XVI). The resultant solid product may then be powdered and used to coat substrates.

In a similar embodiment, the benzoxazine, the aromatic polyamine (or those of Formulas XV-XVI), the fluoropolymer and other optional ingredients and combined in a first stage of an extruder, such as a twin screw extruder. The material is heated and homogeneously mixed, then the higher reactivity aliphatic polyamine is added to the homogeneous mixture and heated to a second temperature to effect at least partial polymerization. The polymerized extrudate may then be directly coated or laminated to a substrate, or powdered for subsequent coating.

Post-curing may be done to further cure the composition or coated article. In one embodiment, the cured benzoxazine composition or multilayer article (comprising the cured benzoxazine and substrate) may be post cured at a temperature of at least 150° C.

EXAMPLES

Samples of benzoxazine and fluoropolymers were made and cured. The cured compositions were characterized and tested to establish chemical resistance, flexibility, and autoclave measurements.

Sample Preparation

Table 1 summarizes the materials used to prepare the samples of benzoxazine and fluoropolymer coatings.

TABLE 1

| Material | Description | Source |
| --- | --- | --- |
| Part A | | |
| Araldite MT 35600 | Bisphenol A Benzoxazine | Huntsman, Woodlands, TX |
| THV 220G | Thermoplastic Fluoropolymer | 3M Company, St. Paul, MN |
| ULV E20575 | Fluoroelastomer | 3M Company, St. Paul, MN |
| PARALOID 2691A | Core Shell Rubber Particle | Dow Chemical, Midland, MI |
| RESIFLOW PF-67 | Flow Control Agent | Estron, Calvert City, KY |
| ACN Blend | Adhesion Promoter | 3M Company, St. Paul, MN |
| Dragonite XR | Alumniosilicate Clay | Applied Minerals, New York, NY |
| CG-1400 | Dicyandiamide Curative | Air Products, Allentown, PA |
| Part B | | |

TABLE 1-continued

| Material | Description | Source |
| --- | --- | --- |
| MXDA diamine | Metaxylene diamine curing agent | Mitsubishi Gas & Chemical, Tokyo |

Examples 1-3

Example 1-3

General procedure

Seven parts by weight of a Part A were mixed with one part of Part B and other adjutants as described in Table 1 to make a curable composition that was mixed through twin screw extrusion. This mixture was later cured at a higher temperature on a selected substrate.

The amounts of each component in Parts A and B are shown in Table 2.

Contents of Part A formulation were placed in a 1 gallon paint can and heated in an oven at 130° C. for 30 minutes after which contents of part B formulation was added to part A and stirred for 1 minute. On cooling to room temperature the solid flakes were ground into a powder using a Strand Mill S102DS Lab Grinder (110 V, 60 Hz from Strand Manufacturing, Hopkins, Minn., USA) and sieved through a 500 micron mesh screen to obtain a relatively uniform size powder.

The ground powder was further melt mixed in an extruder to ensure complete dispersion of the filler into the resin. For this particular example the temperature was 140° C. The screw speed was 100 rpm. The extruder was a 30 mm diameter twin screw extruder model SLJ-30D made by Donghui Powder Processing Equipment Co. of Yantai, China. The extruder has a flat temperature profile ranging from 110° C. to 150° C.

Flakes produced with the extruder/nip system were ground into powder using a Strand Mill S102DS Lab Grinder (110 V, 60 Hz from Strand Manufacturing, Hopkins, Minn., USA) and sieved through a 180 micron mesh screen to obtain a relatively uniform size powder which was used as obtained to coat metal substrates.

Example 2-3 and Comparative Example 1

All samples were made using the mixing and coating process same as the one described in Example 1, using the components of Table 1. For example 2, equal amounts of filler (Dragonite XR) and Fluoropolymer (THV 220G) were used. For Example 3, the materials used in the formulation were the same as that of Example 1 except that the THV 220G was replaced by ULV E20575 Fluoropolymer. For the comparative example the Fluoropolymer was replaced with a core-shell toughener-Paraloid 2691A.

TABLE 2

| Formulation Summary | | | | |
| --- | --- | --- | --- | --- |
| Material | -E1 grams | E2 grams | E3 grams | CE1 grams |
| Araldite MT35600 | 432 | 432 | 432 | 432 |
| MXDA diamine | 34 | 34 | 34 | 34 |
| Dragonite XR | 105 | 69 | 105 | 105 |
| THV 200G | 34.5 | 69 | 0 | 0 |
| ULV E20575 | 0 | 0 | 34.5 | 0 |
| PARALOID 2691A | 0 | 0 | 0 | 34.5 |

TABLE 2-continued

Formulation Summary

| Material | -E1 grams | E2 grams | E3 grams | CE1 grams |
|---|---|---|---|---|
| ACN adhesion promoter | 34.5 | 34.5 | 34.5 | 34.5 |
| CG 1400 | 21 | 21 | 21 | 21 |
| RESIFLOW PF-67 | 3.0 | 3.0 | 3.0 | 3.0 |

Preparation of the Samples for Testing

Samples were made by coating on hot rolled steel coupons with dimensions of 25×200×9.7 mm (1×8×⅜ inches). The steel coupons were solvent washed with methylethylketone (in accordance with SSPC-SP1) followed by an isopropanol rinse. The dry steel surface was grit blasted to a near-white finish in accordance with NACE No. 2/SSPC-SP10 1508501-5A2.5. The steel specimens were pre-heated in an oven set at 230° C. for approximately one hour. Electrostatic spray coating was used to coat samples. Typically 4-6 coupons were used in a test run. A 2 hour postcure at 180° C. was done to ensure full cure. The coated panels, ranging in thickness from 4 to 20 mils (0.38 to 0.51 mm), were tested for flexibility, adhesion and chemical resistance and abrasion resistance according to the following test methods.

Test Methods:

1. Flexibility

Flexibility testing was carried out according to Canadian Standards Association CSA Z245.20-10 Section 12.11. The test bars were then bent using a mandrel specified to obtain the desired degree per pipe diameter (°/PD). Different mandrel sizes were used to give an estimate of the failure point. The highest degree per pipe diameter that passed was confirmed by repeating the test with three specimens at that °/PD. Cracks with the top 12.7 mm (0.5 inch) of the coating were disregarded.

2. Autoclave Test

High temperature test of the coatings was measured using the National Association of Corrosion Engineers NACE TM0185 test method. Testing in an autoclave was done using 3% brine as the aqueous phase, kerosene and toluene as the organic liquid phase and 100% $CO_2$ as the gaseous phase. Testing was carried out at 160° C. and 185° C. at 1500 psi for 96 hours. Adhesion was tested using the knife cut adhesion test. Knife cuts were made through the coating to the substrate in two intersecting lines. The knifepoint was then inserted at the intersection and then flicked up in an attempt to dislodge the coating. If no coating was dislodged the measurement was recorded as a pass. If coating material came off the steel the observation was recorded as fail.

3. Chemical Resistance

An acid immersion test was used to determine the chemical resistance of the cured coating. The test was carried out using 10% HCl solution in room temperature. The duration of the test was 24 hours. Samples were halfway immersed into the acid solution for the duration of the test. The HCl solution was not stirred during the test. After removal of the specimens from the acid solution, the specimens was washed with tap water and dried at room temperature for 1 hour. After drying adhesion of the coatings was measured using a knife cut test. Knife cuts were made through the coating to the substrate in two intersecting lines. The knifepoint was then inserted at the intersection and then flicked up in an attempt to dislodge the coating. If no coating was dislodged the measurement was recorded as a pass. If coating material came off the steel the observation was recorded as fail.

Formulation Summary

TABLE 3

Sample Testing Results

| Example | Chemical Resistance 10% HCl @ 50° C. Rating | Flexibility @ Room Temperature °/PD | Autoclave 185 C., 48 h Rating | Autoclave 160 C., 48 h Rating |
|---|---|---|---|---|
| E1 | Pass | 2 | Pass | Pass |
| E2 | Pass | 2 | Pass | Pass |
| E3 | Pass | 2.5 | Pass | Pass |
| CE1 | Fail | 1.5 | Fail | Fail |

The invention claimed is:

1. A curable composition comprising:
   a) a polybenzoxazine,
   b) a polyamine,
   c) fluoropolymer component;
   d) an optional acid catalyst; and
   e) an polycatechol component.

2. The curable composition of claim 1 wherein the polybenxoxazine is derived from an aromatic amine.

3. The curable composition of claim 1 wherein the polybenzoxazine compound is of the formula:

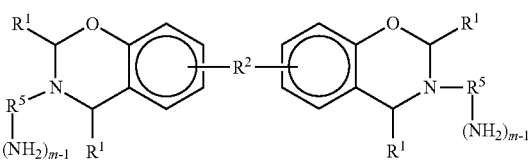

each of $R^1$ is H or an alkyl group;
$R^2$ is H, a covalent bond, or a divalent (hetero)hydrocarbyl group;
m is 1-6, and $R^5$ is the (hetero)hydrocarbyl group.

4. The polybenzoxazine of claim 3 where $R^5$ is an aryl group and m is 1.

5. The curable composition of claim 1 wherein the polybenzoxazine is of the formula:

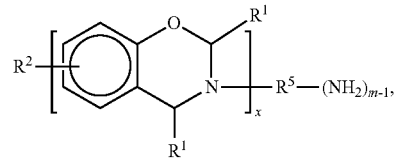

wherein
each of $R^1$ is H or an alkyl group;
$R^2$ is H, a covalent bond, or a polyvalent (hetero)hydrocarbyl group;
$R^5$ is the (hetero)hydrocarbyl residue of a primary amino compound having a valence of x,
m is 1-6; and
x is at least 2.

6. The curable composition of claim 1, wherein said polyamine is of the formula:
$R^{10}(NHR^9)_p$, wherein $R^{10}$ is (hetero)hydrocarbyl group;

p is 1 to 6, and each $R^9$ is H or a hydrocarbyl group.

7. The curable composition of claim 1, wherein the molar ratio of amine equivalents of the polyamine compound to the benzoxazine groups is from 1:2 to 2:1.

8. The curable composition of claim 1, further comprising an acid catalyst.

9. The curable composition of claim 1 further comprising a toughening agent.

10. The curable composition of claim 1 further comprising a particulate filler.

11. The curable composition of claim 10 comprising 1 to 50 parts by weight of filler, relative to 100 parts by weight of the benzoxazine and polyamine.

12. The curable composition of claim 1 wherein the polyamine is an amidine or guanidine compound having at least two amine equivalents.

13. The curable composition of claim 12 wherein the polyamine is of the formula:

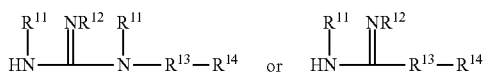

wherein each $R^1$ is independently an alkyl group of 1 to 14 carbon atoms, a cycloalkyl group of 3 to 12 carbon atoms, or an aryl group of 5 to 12 ring atoms, each $R^{12}$ is H of $C_1$-$C_4$ alkyl;

each $R^{13}$ is a covalent bond, an $C_1$-$C_{12}$ alkylene or an arylene of 5 to 12 ring atoms, and $R^{14}$ is H or a functional group selected from amide, ester, nitrile, nitro, sulfide, sulfoxide, sulfone, disulfide, azide, isothiocyanate, amine, hydroxyl, mercaptan, ether, urethane, quaternary ammonium and phosphonium, halogen, silyl, silyloxy, wherein the functional groups are substituted with hydrogen or alkyl or aryl groups.

14. The curable composition of claim 1 wherein the fluoropolymer is selected from fluoroolefin (co)polymers, perfluoroolefin(co)polymers, perfluoroalkyl vinyl ether (co)polymers and perfluoroalkoxy vinyl ether (co)polymers.

15. The curable composition of claim 14 wherein the fluoroolefin (co)polymers are selected from tetrafluoroethylene (TFE) and hexafluoropropylene (HFP)), chlorotrifluoroethylene (CTFE) and vinylidine fluoride (co)polymers.

16. The curable composition of claim 15 wherein the fluoroolefin comprises:

5 to about 90 mol % of its interpolymerized units derived from TFE, CTFE, and/or HFP, from about 5 to about 90 mol % of its interpolymerized units derived from VDF, ethylene, and/or propylene, and up to about 40 mol % of its interpolymerized units derived from a vinyl ether.

17. The composition of claim 14 wherein the fluoropolymer comprises cure-site monomers.

18. The composition of claim 1 wherein the composition further comprises a polycatechol component in amounts of between 0.5 and 20 parts by wt of the relative to 100 parts by weight of the benzoxazine and polyamine.

19. The composition of claim 1 comprising 1-99 wt. % fluoropolymer, and 99-1 wt. % of the mixture of benzoxazine and polyamine.

20. The composition of claim 1 wherein the molar ratio of amine equivalents to the benzoxazine groups is from 2:1 to 1:10.

21. The curable composition of claim 1 wherein the polyamine comprises a mixture of aryl polyamines and aliphatic polyamines.

22. The curable composition of claim 1 comprising a mixture of aliphatic polyamines and at least one of the formula:

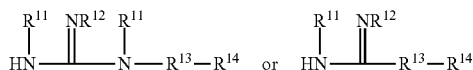

wherein each $R^1$ is independently an alkyl group of 1 to 14 carbon atoms, a cycloalkyl group of 3 to 12 carbon atoms, or an aryl group of 5 to 12 ring atoms, each $R^{12}$ is H of $C_1$-$C_4$ alkyl;

each $R^{13}$ is a covalent bond, an $C_1$-$C_{12}$ alkylene or an arylene of 5 to 12 ring atoms, and $R^{14}$ is H or a functional group selected from amide, ester, nitrile, nitro, sulfide, sulfoxide, sulfone, disulfide, azide, isothiocyanate, amine, hydroxyl, mercaptan, ether, urethane, quaternary ammonium and phosphonium, halogen, silyl, silyloxy, wherein the functional groups are substituted with hydrogen or alkyl or aryl groups.

23. The composition of claim 1 comprising 1-30 wt. % fluoropolymer, and 99-70 wt. % of the mixture of benzoxazine and polyamine.

24. The curable composition of claim 1 further comprising an epoxy resin.

25. A composition comprising the cured composition of claim 1.

26. An article comprising a substrate and a cured coating of the composition of claim 1 on at least one surface thereof.

* * * * *